US008392086B2

(12) United States Patent
Taniguchi et al.

(10) Patent No.: US 8,392,086 B2
(45) Date of Patent: Mar. 5, 2013

(54) BRAKE FLUID PRESSURE CONTROLLING DEVICE

(75) Inventors: Masahiko Taniguchi, Chiryu (JP); Masanobu Fukami, Hazu-gun (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 344 days.

(21) Appl. No.: 12/887,020

(22) Filed: Sep. 21, 2010

(65) Prior Publication Data

US 2011/0071743 A1 Mar. 24, 2011

(30) Foreign Application Priority Data

Sep. 24, 2009 (JP) .................................. 2009-218838

(51) Int. Cl.
*B60T 8/36* (2006.01)
*F16K 31/06* (2006.01)
*G06F 19/00* (2006.01)

(52) U.S. Cl. .............................. 701/70; 701/83; 303/186

(58) Field of Classification Search .................... 701/70, 701/36, 76, 79, 83; 303/186, 116.1; 340/450.1; 188/170, 72.1
See application file for complete search history.

(56) References Cited

U.S. PATENT DOCUMENTS

| 5,261,731 A | * | 11/1993 | Yogo et al. | .................. 303/116.1 |
| 6,085,141 A | * | 7/2000 | Fujioka et al. | ................... 701/76 |
| 2010/0219026 A1 | * | 9/2010 | Fukasawa et al. | ........... 188/72.1 |

FOREIGN PATENT DOCUMENTS

| JP | 01-145483 A | 6/1989 |
| JP | 4-003824 A | 1/1992 |

* cited by examiner

Primary Examiner — Tan Q Nguyen
(74) Attorney, Agent, or Firm — Buchanan Ingersoll & Rooney PC

(57) ABSTRACT

A brake fluid pressure controlling device is provided that controls a brake actuator to adjust brake fluid pressure in a wheel cylinder provided to correspond to a wheel. The brake actuator includes a passage for supplying the brake fluid to the wheel cylinder, a pump that discharges the brake fluid to the passage, and an electromagnetic valve that is located in the passage and adjusts the pressure of the brake fluid flowing into the wheel cylinder. The device includes a discharge rate detecting section, a signal generating section, a noise generating section, a noise overlaying section, and an electromagnetic valve controlling section. The discharge rate detecting section detects the discharge rate of the brake fluid discharged by the pump. The signal generating section generates a command signal for controlling the electromagnetic valve. The noise generating section generates noise, the noise being an AC signal corresponding to the detected discharge rate. The noise overlaying section overlays the noise onto the command signal, thereby generating an overlaid command signal. The electromagnetic valve controlling section controls the electromagnetic valve according to the overlaid command signal.

16 Claims, 6 Drawing Sheets

BRAKE FLUID PRESSURE CONTROLLING DEVICE

BACKGROUND OF THE INVENTION

The present invention relates to a brake fluid pressure controlling device that controls electromagnetic valves provided in a passage for brake fluid, thereby adjusting the brake fluid pressure in wheel cylinders.

A typical brake actuator mounted on a vehicle includes linear electromagnetic valves arranged in a passage connecting a master cylinder and wheel cylinders, and pumps that are located in the passage and connected to a part between the linear electromagnetic valves and the wheel cylinders. While the pump is operating, each linear electromagnetic valve is controlled to adjust the pressure difference between the brake fluid pressures on both sides of the linear electromagnetic valve, thereby adjusting the brake fluid pressures in the wheel cylinder.

These linear electromagnetic valves are activated in response to a command signal sent from an electronic control unit (ECU) for a brake actuator, for example, during the execution of the Adaptive Cruise Control (ACC). The faster the response speed of the linear electromagnetic valve, the quicker the brake fluid pressure in each wheel cylinder, or the braking force applied to the corresponding wheel, is adjusted to a target brake fluid pressure, or a target braking force. Japanese Laid-Open Patent Publication No. 1-145483 and Japanese Laid-Open Patent Publication No. 4-3824 disclose controlling methods for increasing the response speed of electromagnetic valves as typified by linear electromagnetic valves.

According to the prior art methods for controlling an electromagnetic valve, noise (for example, random noise that is an AC signal having random frequencies) is overlaid onto a command signal to generate an overlaid command signal, and the linear electromagnetic valve is controlled according to the overlaid command signal. The influence of the noise causes micro vibration of the valve body of the linear electromagnetic valve. Thus, when the valve body is displaced, it receives kinetic frictional force, which is smaller than static frictional force, instead of static frictional force. Compared to a case where the valve body receives static frictional force, the response speed of the linear electromagnetic valve is increased.

In addition to the urging force of the incorporated spring and electromagnetic force generated by the incorporated electromagnetic coil, the valve body of a linear electromagnetic valve receives the force of brake fluid discharged by a pump (also referred to as pump discharge force). The pump discharge force has a magnitude that varies in accordance with the operating state of the pump and acts on the valve body in a direction to increase the brake fluid pressure in the wheel cylinder. That is, if a linear electromagnetic valve is controlled according to an overlaid command signal, the force applied to the valve body is increased as the pump discharge force is increased. As a result, the micro vibration of the valve body is increased more than necessary, and the brake fluid pressure in each wheel cylinder, that is, the braking force applied to the wheel, may fluctuate.

To solve this problem, the amplitude of the noise may be set to a value that causes the brake fluid pressure in the wheel cylinder to fluctuate insignificantly even when the pump discharge pressure is great. However, if the linear electromagnetic valve is controlled according to an overlaid command signal when the pump discharge force is small, insufficient or no micro vibration of the valve body is generated. The response speed of the linear electromagnetic valve therefore cannot be increased.

SUMMARY OF THE INVENTION

Accordingly, it is an objective of the present invention to provide a brake fluid pressure controlling device that is capable of increasing the response speed of an electromagnetic valve regardless of the operating state of a pump, thereby reliably adjusting the brake fluid pressure in a wheel cylinder.

To achieve the foregoing an other objectives and in accordance with one aspect of the present invention, a brake fluid pressure controlling device is provided that controls a brake actuator to adjust brake fluid pressure in a wheel cylinder provided to correspond to a wheel. The brake actuator includes a passage for supplying the brake fluid to the wheel cylinder, a pump that discharges the brake fluid to the passage, and an electromagnetic valve that is located in the passage and adjusts the pressure of the brake fluid flowing into the wheel cylinder. The device includes a discharge rate detecting section, a signal generating section, a noise generating section, a noise overlaying section, and an electromagnetic valve controlling section. The discharge rate detecting section detects the discharge rate of the brake fluid discharged by the pump. The signal generating section generates a command signal for controlling the electromagnetic valve. The noise generating section generates noise that is an AC signal corresponding to the detected discharge rate. The noise overlaying section overlays the noise onto the command signal, thereby generating an overlaid command signal. The electromagnetic valve controlling section controls the electromagnetic valve according to the overlaid command signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 7. In the following description, the forward direction of the vehicle refers to the direction in which the vehicle normally advances. Also, unless otherwise specified, left and right refers to left and right in relation to a person seated in the vehicle and facing forward, i.e., facing toward the advancing direction of the vehicle.

Figure 1:
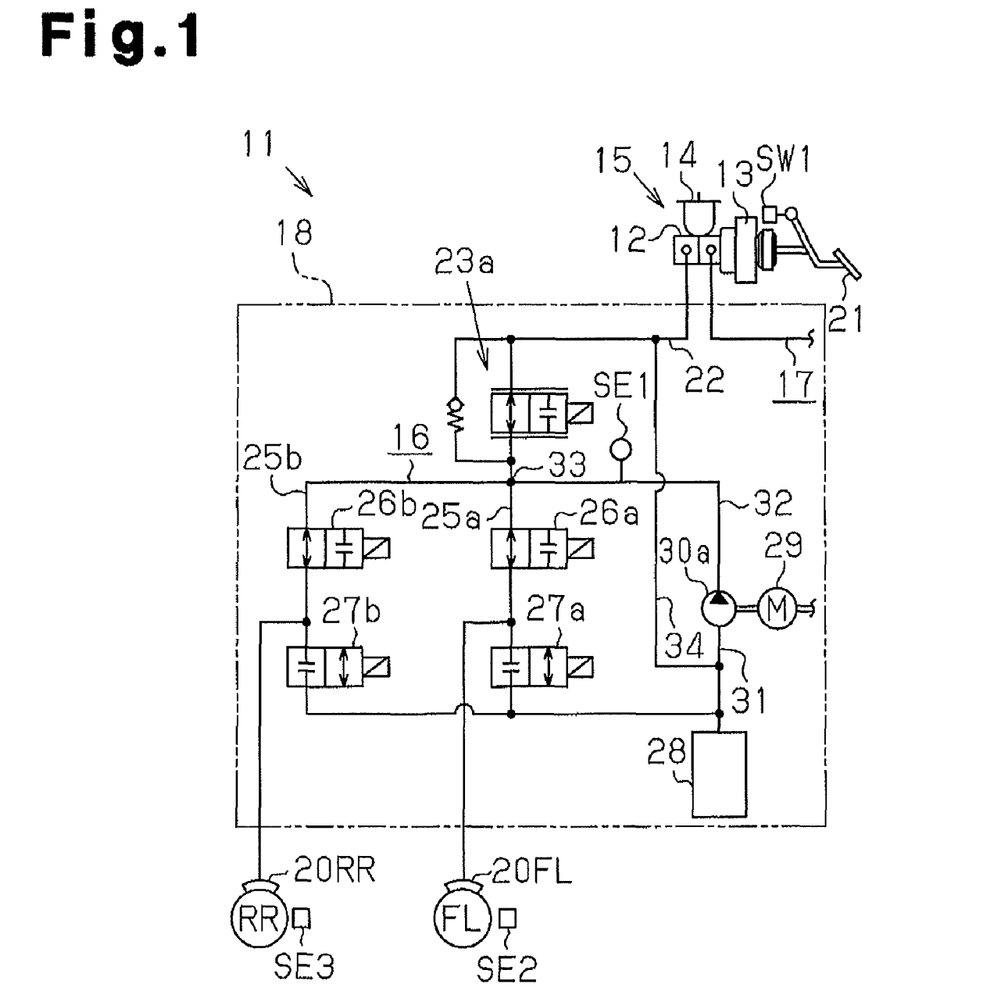
FIG. 1 is a block diagram illustrating a vehicle braking device according to one embodiment of the present invention.

In the present embodiment, the vehicle is an automobile with four wheels, specifically right front wheel, left front wheel, right rear wheel, and left rear wheel. The vehicle is driven when the driver steps on the accelerator pedal and drive force of corresponding magnitude is transmitted to the drive wheels (for example, the rear wheels). The vehicle includes a braking device 11 for applying braking force to the wheels as shown in FIG. 1.

The braking device 11 includes a hydraulic pressure generator 15 and a brake actuator 18. The hydraulic pressure generator 15 has a master cylinder 12, a booster 13, and a reservoir 14. As shown by an alternate long and two short dashes line in FIG. 1, the brake actuator 18 includes two hydraulic circuits 16, 17. The braking device 11 further has an electronic control unit (hereinafter, also referred to as an ECU) 19 (see FIG. 2) for controlling the brake actuator 18. The ECU 19 serves as a brake fluid pressure controlling device. The hydraulic circuits 16, 17 are connected to a master cylinder 12 of a hydraulic pressure generator 15. The first hydraulic circuit 16 is connected to a wheel cylinder 20FL of the left front wheel FL and a wheel cylinder 20RR of the right rear wheel RR. The second hydraulic circuit 17 is connected to a wheel cylinder (not shown) of the right front wheel and a wheel cylinder (not shown) of the left rear wheel.

The hydraulic pressure generator 15 has a brake pedal 21. When the driver of the vehicle operates the brake pedal 21, the master cylinder 12 and the booster 13 are activated. Brake fluid is then supplied to the wheel cylinders from the master cylinder 12 through the hydraulic circuits 16, 17, so that braking force in the pressure in each wheel cylinder (brake fluid pressure) Pwc (see FIG. 6) is applied to the corresponding wheel. The hydraulic pressure generator 15 has a brake switch SW1. When the brake pedal 21 is operated, the brake switch SW1 sends an ON signal to the ECU 19. When the brake pedal 21 is not operated, the brake switch SW1 output an OFF signal to the ECU 19.

The brake actuator 18 will now be described. Since both of the hydraulic circuits 16, 17 substantially have the same configuration, only the first hydraulic circuit 16 is shown in FIG. 1, and the second hydraulic circuit 17 is omitted.

Figure 2:
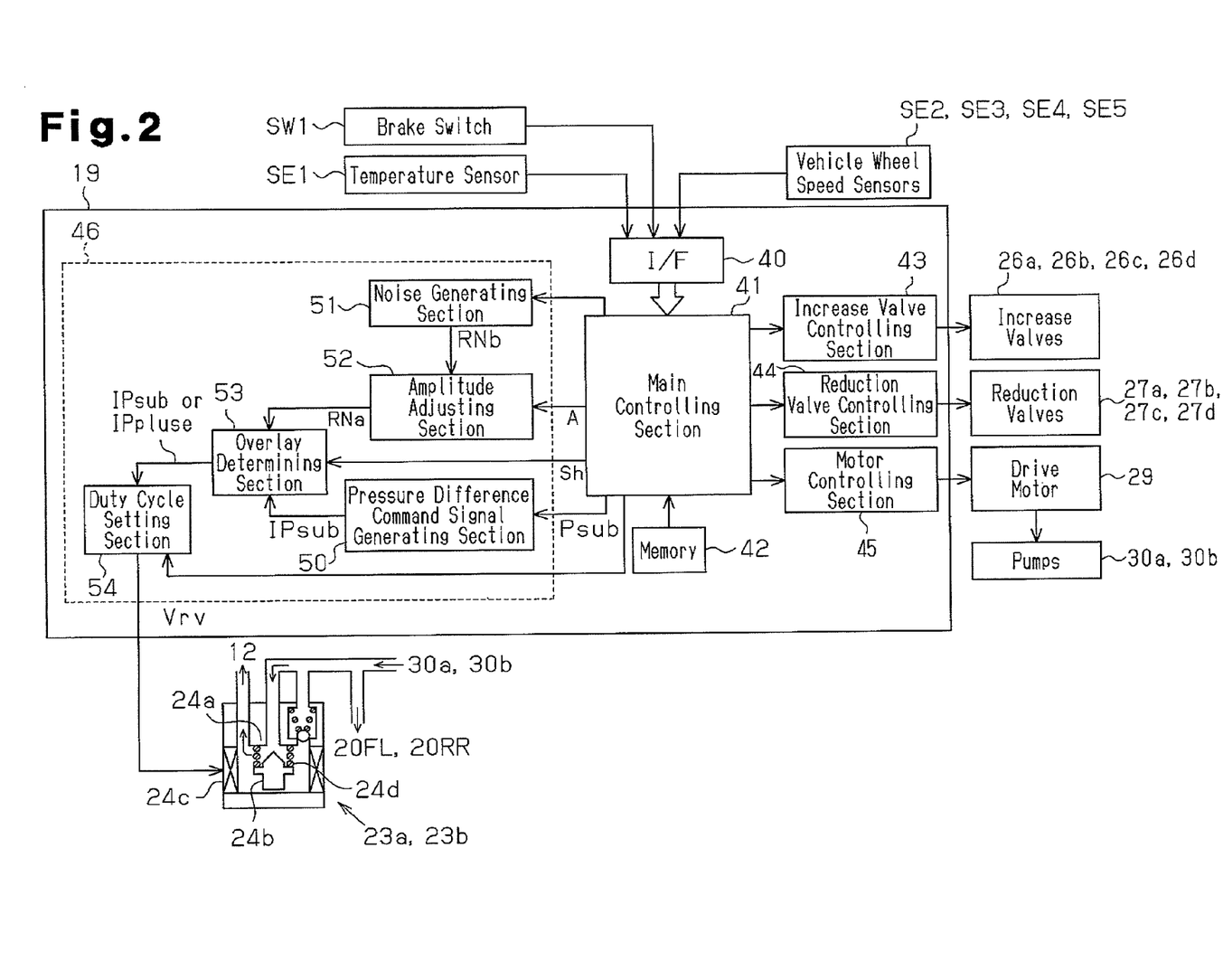
FIG. 2 is a block diagram showing an electronic control unit according to one embodiment of the present invention.

The first hydraulic circuit 16 is connected to the master cylinder 12 via a coupling passage 22 having a normally open linear electromagnetic valve 23a. That is, the linear electromagnetic valve 23a is located in the coupling passage 22 and between the wheel cylinders 20FL, 20RR and the master cylinder 12. As shown in FIGS. 1 and 2, the linear electromagnetic valve 23a includes a valve seat 24a, a valve body 24b, an electromagnetic coil 24c, and an urging member 24d (for example, a coil spring), which urges the valve body 24b away from the valve seat 24a. The valve body 24b is displaced in accordance with a current value supplied to the electromagnetic coil 24c from the ECU 19. The position of the valve body 24b in relation to the valve seat 24a is adjusted such that the pressure difference (hereinafter, an actual pressure difference) between the master cylinder pressure in the master cylinder 12 and the wheel cylinder pressure Pwc in the wheel cylinders 20FL, 20RR is equal to a target pressure difference Psub (see FIG. 6). That is, in a state where the brake pedal 21 is not operated, the closer to the valve seat 24a the valve body 24b, the greater the passage resistance acting on brake fluid flowing through the linear electromagnetic valve 23a becomes. Accordingly, the actual pressure difference, that is, the wheel cylinder pressure Pwc increases.

The first hydraulic circuit 16 includes a left front wheel passage 25a connected to the wheel cylinder 20FL, and a right rear wheel passage 25b connected to the wheel cylinder 20RR. Increase valves 26a, 26b and reduction valves 27a, 27b are provided in the passages 25a, 25b, respectively. The increase valves 26a, 26b are normally open electromagnetic valves and are respectively activated for limiting increase in the wheel cylinder pressure Pwc in the wheel cylinders 20FL, 20RR. The reduction valves 27a, 27b are normally closed electromagnetic valves and are activated for lowering the wheel cylinder pressure in the wheel cylinders 20FL, 20RR, respectively.

The first hydraulic circuit 16 is connected to a reservoir 28 and a pump 30a. The reservoir 28 temporarily retains brake fluid that has flowed out of the wheel cylinders 20FL, 20RR through the reduction valves 27a, 27b. The pump 30a is activated based on rotation of a drive motor 29. The pump 30a is connected to the reservoir 28 via an inlet passage 31 and to a joint 33 between the increase valves 26a, 26b and the linear electromagnetic valve 23a via a supply passage 32. That is, the pump 30a is connected to a part between the linear electromagnetic valve 23a and the wheel cylinders 20FL, 20RR. The inlet passage 31 has a branch hydraulic passage 34 branched toward the master cylinder 12. When the drive motor 29 rotates, the pump 30a draws brake fluid from the reservoir 28 and the master cylinder 12 through the inlet passage 31 and the branch hydraulic passage 34, respectively, and discharges the brake fluid into the supply passage 32.

A temperature sensor SE1 (for example, thermistor) is connected to the first hydraulic circuit 16 of the present embodiment to detect the temperature of brake fluid discharged by the pump 30a. The temperature sensor SE1 sends a detection signal that corresponds to a temperature Tb (see FIG. 3E) of the brake fluid to the ECU 19.

Like the first hydraulic circuit 16, the second hydraulic circuit 17 has a linear electromagnetic valve 23b, increase valves 26c, 26d, reduction valves 27c, 27d, a reservoir (not shown), and a pump 30b (see FIG. 2).

The structure of the ECU 19 will now be described with reference to FIG. 2.

As shown in FIG. 2, an interface 40 of the ECU 19 is connected to the brake switch SW1, the temperature sensor SE1, and vehicle wheel speed sensors SE2, SE3, SE4, SE5 that compute the rotation speeds of the wheels. The ECU 19 is electrically connected to the valves 23a, 23b, 26a to 26d, and 27a to 27d, and the drive motor 29. Based on detection signals from the brake switch SW1 and various sensors SE1 to SE5, the ECU 19 separately controls the valves 23a, 23b, 26a to 26d, and 27a to 27d, and the drive motor 29 (that is, the pumps 30a, 30b).

The ECU 19 has functioning sections formed by a digital computer having a CPU, ROM, and RAM, and various driver circuits. The functioning sections include a main controlling section 41, a memory 42, a increase valve controlling section 43, a reduction valve controlling section 44, a motor controlling section 45, and a linear valve controlling section 46. In FIG. 2, the linear valve controlling section 46 corresponds to a section encompassed by a broken line.

The main controlling section 41 is formed by, for example, a CPU. When executing various control procedures (for example, a procedure for controlling a linear electromagnetic valve), the main controlling section 41 separately outputs command signals to the increase valve controlling section 43, the reduction valve controlling section 44, the motor controlling section 45, and the linear valve controlling section 46. The memory 42 includes a ROM and a RAM. The memory 42 stores in advance various control procedures executed by the main controlling section 41, various maps (including maps shown in FIGS. 3A to 3E), and threshold values (including a discharge rate threshold value and rate-of-change threshold value).

The increase valve controlling section 43 is formed by hardware such as driver circuits, and separately controls the increase valves 26a to 26d based on command signals from the main controlling section 41. The reduction valve controlling section 44 is formed by hardware such as driver circuits, and separately controls the reduction valves 27a to 27d based on command signals from the main controlling section 41. The motor controlling section 45 is formed by hardware such as driver circuits, and controls the drive motor 29 (that is, the pumps 30a, 30b) based on command signals from the main controlling section 41. That is, the controlling sections 43 to 45 each generate voltage signals the duty cycles of which correspond to command signals from the main controlling section 41, and separately apply the voltage signals to the valves 26a to 26d, 27a to 27d, and the drive motor 29.

The linear valve controlling section 46 will now be described.

The linear valve controlling section 46 is formed at least by a CPU and includes other hardware as necessary. The linear valve controlling section 46 includes a pressure difference command signal generating section 50 and a noise generating section 51. The pressure difference command signal generating section 50 generates a pressure difference command signal IPsub based on a target pressure difference Psub set by the main controlling section 41, and a noise generating section 51 generates reference noise RNb based on a command signal from the main controlling section 41. The linear valve controlling section 46 includes an amplitude adjusting section 52 and an overlay determining section 53. The amplitude adjusting section 52 generates active noise RNa based on reference noise RNb from the noise generating section 51 and an amplitude A set by the main controlling section 41. The overlay determining section 53 receives a determination command Sh from the main controlling section 41. Further, the linear valve controlling section 46 includes a duty cycle setting section 54 that sets a duty cycle of a voltage signal applied to the linear electromagnetic valve 23a based on the received signals IPsub, IPpluse. The command signal IPpluse is an overlaid command signal that is generated by overlaying the active noise RNa onto the pressure difference command value IPsub.

The pressure difference command signal generating section 50 generates the pressure difference command value IPsub to adjust the valve body 24b to a position where the actual pressure difference matches with the target pressure difference Psub, and outputs the pressure difference command signal IPsub to the overlay determining section 53. The greater the target pressure difference Psub, that is, the closer to the valve seat 24a the valve body 24b in the linear electromagnetic valve 23a, the greater the current value of the generated pressure difference command value IPsub becomes. In the present embodiment, the pressure difference command signal generating section 50 functions as a signal generating section.

The noise generating section 51 outputs the reference noise RNb to the amplitude adjusting section 52. The reference noise RNb is an alternate current signal, or a random noise, in which at least one of the frequency and the amplitude changes irregularly. In the present embodiment, the amplitude of the reference noise RNb (also referred to as a reference amplitude) is constant.

The amplitude adjusting section 52 adjusts the reference amplitude of the reference noise RNb to the amplitude A set by the main controlling section 41, thereby generating the active noise RNa. The amplitude adjusting section 52 outputs the active noise RNa to the overlay determining section 53. In the present embodiment, the noise generating section 51 and the amplitude adjusting section 52 form a noise generating section.

The overlay determining section 53 determines whether to overlay the active noise RNa onto the pressure difference command value IPsub based on the determination command Sh from the main controlling section 41. When determining to overlay the active noise RNa onto the pressure difference command signal IPsub, the overlay determining section 53 overlays the active noise RNa onto the pressure difference command signal IPsub, thereby generating an overlaid command signal IPpluse, and outputs the overlaid command signal IPpluse to the duty cycle setting section 54. When determining not to overlay the active noise RNa onto the pressure difference command signal IPsub, the overlay determining section 53 outputs the pressure difference command signal IPsub to the duty cycle setting section 54. In the present embodiment, the overlay determining section 53 functions as a noise overlaying section.

The duty cycle setting section 54 generates a voltage signal (also referred to as a valve controlling voltage signal) Vrv, which has a duty cycle corresponding to the input command signals IPsub, IPpluse. The duty cycle setting section 54 applies the valve controlling voltage signal Vrv to the electromagnetic coils 24c of the linear electromagnetic valves 23a, 23b, thereby controlling the linear electromagnetic valves 23a, 23b. In the present embodiment, the duty cycle setting section 54 functions as an electromagnetic valve controlling section.

The magnitude of the amplitude A of the active noise RNa set by the amplitude adjusting section 52 is determined such that the wheel cylinder pressure Pwc fluctuates insignificantly due to micro vibration of the valve bodies 24b of the linear electromagnetic valves 23a, 23b.

Next, various maps stored in the memory 42 will now be described with reference to FIGS. 3A to 3E.

Figures 3A, 3B:
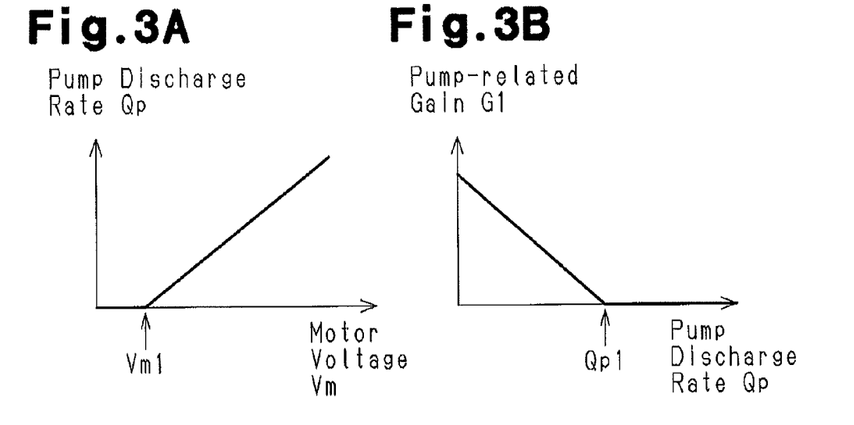
FIG. 3A is a map for detecting a pump discharge rate based on a motor voltage.
FIG. 3B is a map for setting a first gain based on the pump discharge rate.

A first map shown in FIG. 3A is used for obtaining the displacement of brake fluid discharged from the pumps 30a, 30b per unit time based on the voltage applied to the drive motor 29 (hereinafter referred to as motor voltage), that is, a pump discharge rate Qp. As shown in FIG. 3A, when the motor voltage Vm is less than a first motor voltage Vm1, the pump discharge rate Qp is set to zero. When the motor voltage Vm is greater than or equal to the first motor voltage Vm1, the pump discharge rate Qp increases as the motor voltage Vm increases. According to the present embodiment, the drive motor 29 is subjected to PWM (Pulse Width Modulation) control. Thus, an increase in the motor voltage Vm refers to an increase in the duty cycle of the motor voltage Vm.

A second map shown in FIG. 3B is used for setting a pump-related gain G1 applied to the active noise RNa, based on the pump discharge rate Qp. As shown in FIG. 3B, the pump-related gain G1 is reduced as the pump discharge rate Qp increased. The pump-related gain G1 is set to zero when the pump discharge rate Qp surpasses the first discharge rate Qp1. That is, when the drive motor 29 rotates at the maximum speed, the pump-related gain G1 is set to zero.

Figures 3C, 3D:
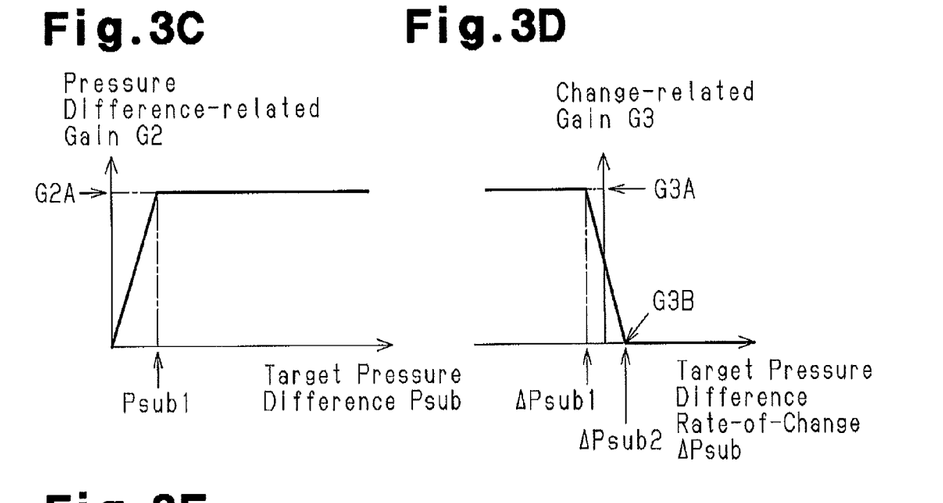
FIG. 3C is a map for setting a second gain based on a target pressure difference.
FIG. 3D is a map for setting a third gain based on a rate-of-change of the target pressure difference.

A third map shown in FIG. 3C is used for setting a pressure difference-related gain G2 relative to the active noise RNa, based on the target pressure difference Psub set by the main controlling section 41. In a case where the target pressure difference Psub is less than or equal to the first target pressure difference Psub1, the pressure difference-related gain G2 is increased as the target pressure Psub increases. When the target pressure Psub surpasses the first target pressure Psub1, the pressure difference-related gain G2 is set to a first pressure difference-related gain G2A (for example, one).

A fourth map shown in FIG. 3D is used for setting a change-related gain G3 based on the amount of change ΔPsub in the target pressure difference Psub set by the main controlling section 41 per unit time (that is, the differential of the target pressure difference Psub, and referred to as a "target pressure difference rate-of-change"). As shown in FIG. 3D, the change-related gain G3 is set to a first change-related gain G3A (for example, one) when the target pressure difference rate-of-change ΔPsub is less than the first rate-of-change ΔPsub1, which is less than zero. The change-related gain G3 is set to a second change-related gain G3B (for example, zero) when the target pressure difference rate-of-change ΔPsub surpasses a second rate-of-change ΔPsub2, which is greater than the first rate-of-change ΔPsub1. When the target pressure difference rate-of-change ΔPsub is greater than or equal to the first rate-of-change ΔPsub1 and less than or equal to the second rate-of-change ΔPsub2, the change-related gain G3 is reduced as the target pressure difference rate-of-change ΔPsub increases.

Figure 3E:
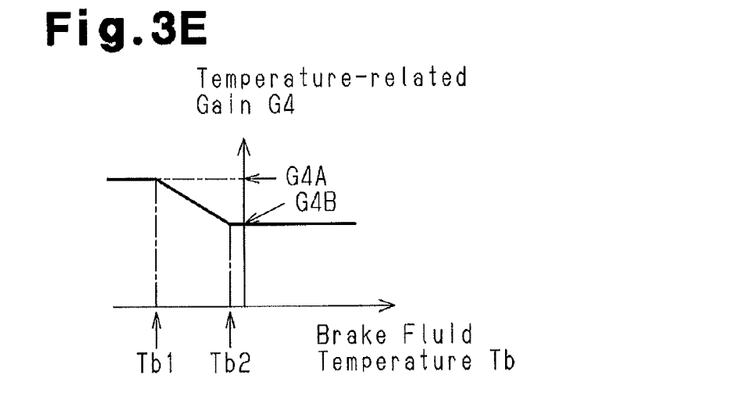
FIG. 3E is a map for setting a fourth gain based on the temperature of brake fluid.

A fifth map shown in FIG. 3E is used for setting a temperature-related gain G4 based on the brake fluid temperature Tb. As shown in FIG. 3E, the temperature-related gain G4 is set to a first temperature-related gain G4A (for example, one) when the temperature Tb of the brake fluid is less than a first fluid temperature Tb1. When the brake fluid temperature Tb surpasses a second fluid temperature Tb2, which is higher than the first fluid temperature Tb1, the temperature-related gain G4 is set to a second temperature-related gain G4B (for example, 0.6), which is smaller than the first temperature-related gain G4A. When the brake fluid temperature Tb is greater than or equal to the first fluid temperature Tb1 and less than or equal to the second fluid temperature Tb2, the temperature-related gain G4 is reduced as the brake fluid temperature Tb increases.

Figure 4:
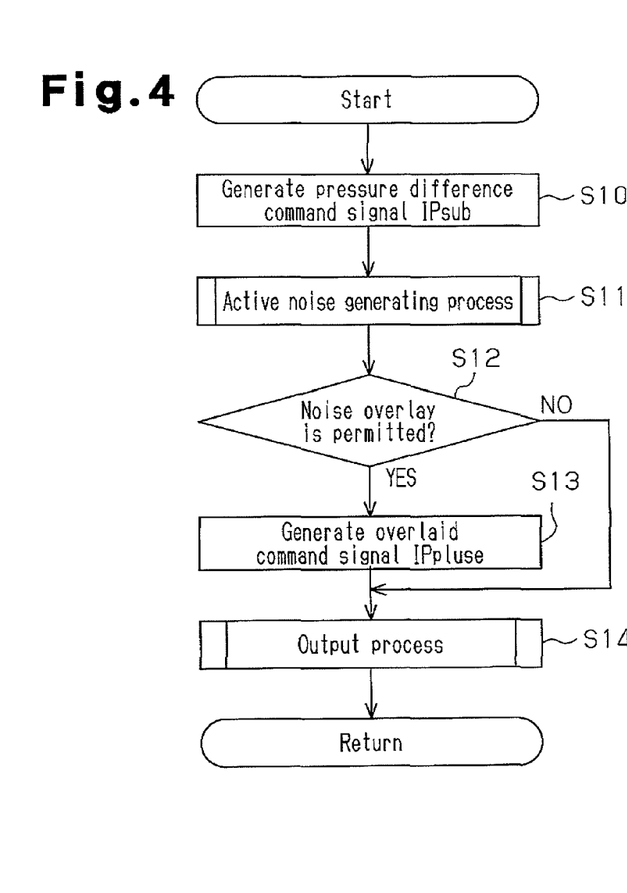
FIG. 4 is a flowchart for explaining a process routine for controlling a linear electromagnetic valve.

Among various brake controlling process routines executed by the ECU 19 of the present embodiment, a process routine for controlling the linear electromagnetic valves 23a, 23b will be described with reference to the flowchart of FIG. 4.

The ECU 19 executes the linear electromagnetic valve controlling process routine at a predetermined cycle, for example, every few milliseconds. In the linear electromagnetic valve controlling process routine, the main controlling section 41 of the ECU 19 causes the pressure difference command signal generating section 50 to generate a pressure difference command signal IPsub, which is used for adjusting the valve body 24b such that the actual pressure difference matches with the target pressure difference Psub (step S10). Subsequently, the main controlling section 41 executes an active noise generating process shown in FIG. 6 (step S11). In the active noise generating process, an active noise RNa is generated that is suitable for increasing the response speed of the linear electromagnetic valves 23a, 23b.

Subsequently, the main controlling section 41 outputs a determination command value Sh to the overlay determining section 53 based on a signal from the brake switch SW1. Based on the determination command value Sh, the overlay determining section 53 determines whether to permit the active noise RNa generated at step S11 to be overlaid onto the pressure difference command signal IPsub generated at step S11 (step S12). When the signal from the brake switch SW1 is an OFF signal, that is, when the brake pedal 21 is being operated, the main controlling section 41 outputs a determination command Sh permitting overlay. When a signal from the brake switch SW1 is an ON signal, that is, when the brake pedal 21 is not being operated, the main controlling section 41 outputs a determination signal Sh that restricts overlay.

When the determination result at step S12 is positive (SW1=OFF), the overlay determining section 53 generates an overlaid command signal IPpluse and sends the signal to the duty cycle setting section 54 (step S13), Then, the process proceeds to step S14, which will be discussed below. When the determination result at step S12 is negative (SW1=ON), the overlay determining section 53 sends a pressure difference command value IPsub to the duty cycle setting section 54. Then, the process proceeds to the subsequent step S14.

At step S14, the main controlling section 41 executes an output process. In the output process, the duty cycle setting section 54 generates a valve controlling voltage Vrv having a duty cycle that corresponds to the received command signals IPpluse, IPsub, and sends the valve controlling voltage Vrv to the linear electromagnetic valves 23a, 23b, thereby controlling the linear electromagnetic valves 23a, 23b. Thereafter, the linear electromagnetic valve controlling process routine is temporarily ended.

Figure 5:
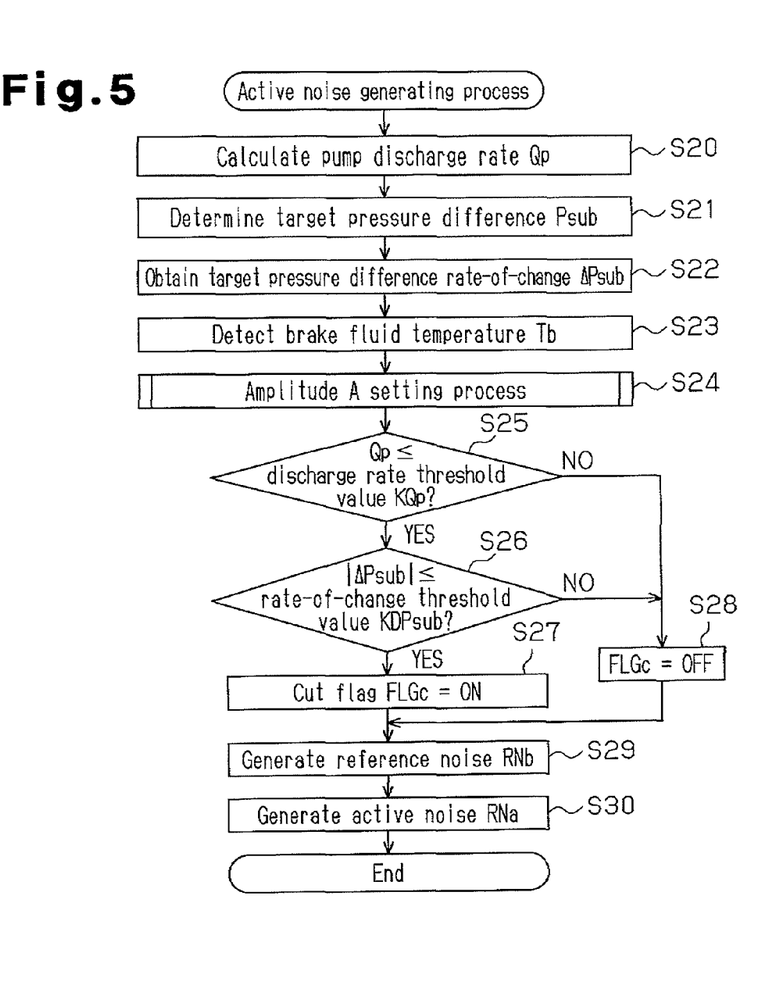
FIG. 5 is a flowchart for explaining a process routine for generating active noise.

Next, the active noise generating process (active noise generating process routine) will now be described with reference to flowchart shown in FIG. 5.

In the active noise generating process routine, the main controlling section 41 obtains a motor voltage Vm to be applied to the drive motor 29 by the motor controlling section 45, and calculates the pump discharge rate Qp from the pumps 30a, 30b from the motor voltage Vm, using the first map (step S20). In the present embodiment, the main controlling section 41 functions as a discharge rate detecting section. Subsequently, the main controlling section 41 determines the target pressure difference Psub (step S21), and differentiates the target pressure difference Psub to obtain the target pressure difference rate-of-change ΔPsub (step S22). That is, if the target pressure difference Psub is decreasing at step S22, the amount of decrease of the target pressure difference Psub per unit time is computed. In the present embodiment, the main controlling section 41 functions as a fluid pressure rate-of-change detecting section and a fluid pressure lowering rate detecting section. Next, the main controlling section 41 detects the temperature Tb of the brake fluid based on a detection signal sent from the temperature sensor SE1 (step S23).

The main controlling section 41 executes a process for setting the amplitude A of the active noise RNa (step S24). That is, using the second map, the main controlling section 41 sets a pump-related gain G1 that corresponds to the pump discharge rate Qp detected at step S20. Then, using the third map, the main controlling section 41 sets a pressure difference-related gain G2 that corresponds to the target pressure difference obtained at step S21. Subsequently, using the fourth map, the main controlling section 41 sets a change-related gain G3 that corresponds to the target pressure difference rate-of-change ΔPsub detected at step S22. Then, using the fifth map, the main controlling section 41 sets a temperature-related gain G4 that corresponds to the brake fluid temperature Tb detected at step S23. The main controlling section 41 multiplies the reference amplitude of the reference noise RNb generated by the noise generating section 51 by the gains G1 to G4, thereby calculating the amplitude A (A=reference amplitude×G1×G2×G3×G4). The setting process of the amplitude A is then finished.

Subsequently, the main controlling section 41 determines whether the pump discharge rate Qp detected at step S20 is less than or equal to a predetermined discharge rate threshold value KQp (step S25). The discharge rate threshold value KQp is a reference value for determining whether the flow rate of the brake fluid in the hydraulic circuits 16, 17 is low, and is set in advance through experiments and simulations. If the determination result is positive (Qp≦KQp) at step S25, the main controlling section 41 determines whether the absolute value of the target pressure difference rate-of-change ΔPsub detected at step S22 is less than or equal to a rate-of-change threshold value KDPsub (step S26). The rate-of-change threshold value KDPsub is a reference value for determining whether the wheel cylinder pressure Pwc changes insignificantly, that is, whether the wheel cylinder pressure Pwc is in a constant pressure state, and is set in advance through experiments and simulations.

When the determination result is positive at step S26 (ΔPsub≦KDPsub), the main controlling section 41 determines that the flow rate of the brake fluid in the hydraulic circuits 16, 17 is low and that wheel cylinder pressure Pwc is in a constant pressure state. Then, the main controlling section 41 sets a cut flag FLGc to ON. Then, the process proceeds to step S29, which will be discussed below. In contrast, when the determination result of at least one of steps S25 and S26 is negative, the main controlling section 41 sets a cut flag FLGc to OFF (step S28). Then, the process proceeds to the subsequent step S29. Among the components of the amplitude A of the active noise RNa, a component that reduces the wheel cylinder pressure Pwc is referred to as a first amplitude component A1, and a component that increases the wheel cylinder pressure Pwc will be referred to as a second amplitude component A2. The cut flag FLGc is a flag for permitting or prohibiting cut of the first amplitude component A1.

At step S29, The noise generating section 51 outputs the reference noise RNb to the amplitude adjusting section 52. The main controlling section 41 sends to the amplitude adjusting section 52 a command signal that corresponds to the results of steps S24, S27, and S28, so that the amplitude adjusting section 52 generates the active noise RNa (step S30). That is, when the cut flag FLGc is OFF, the amplitude adjusting section 52 generates the active noise RNa having the amplitude A computed at step S24, and sends the active noise RNa to the overlay determining section 53. When the cut flag FLGc is ON, the amplitude adjusting section 52 generates the active noise RNa from which the first amplitude component A1 has been cut, and sends the active noise RNa to the overlay determining section 53. Thereafter, the active noise generating process routine is ended.

Figure 6:
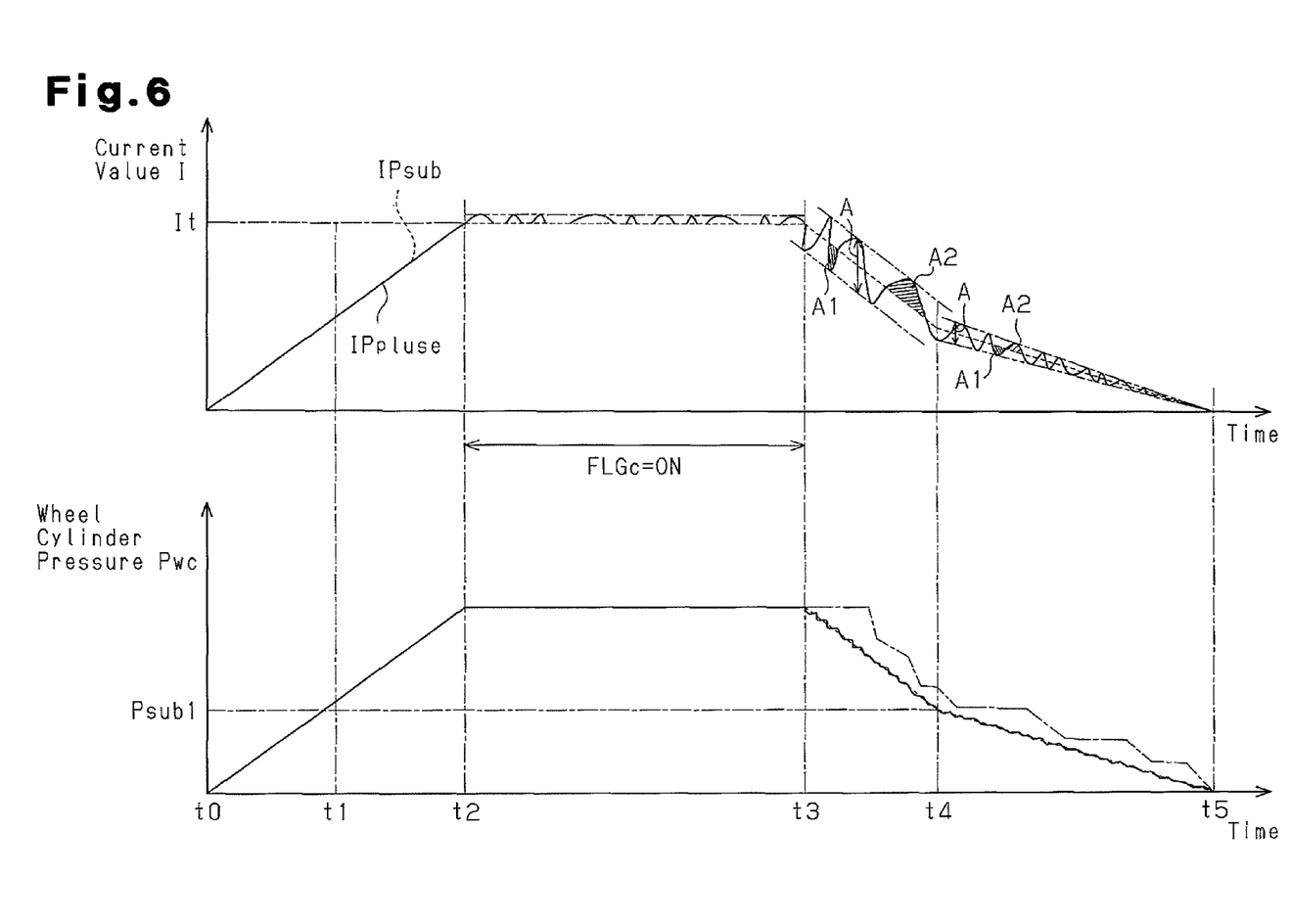
FIG. 6 is a timing chart showing a current value supplied to the linear electromagnetic valve and the wheel cylinder pressure.

Next, a current value that is supplied to the linear electromagnetic valves 23a, 23b when the valves 23a, 23b are activated to adjust the wheel cylinder pressure Pwc, and changes in the wheel cylinder pressure will be described with reference to FIG. 6. In FIG. 6, the amplitude A of the active noise RNa and the fluctuation of the actual wheel cylinder pressure Pwc are exaggerated. In the case described below, the increase valves 26a to 26d and the reduction valves 27a to 27d are not activated.

As shown in FIG. 6, when the pumps 30a, 30b are activated and the current value I supplied to the electromagnetic coils 24c of the linear electromagnetic valves 23a, 23b is gradually increased, the actual pressure difference is increased. As a result, the wheel cylinder pressure Pwc is increased (first time point t1). During the period from the initial time point t0 to a second time point t2, the actual pressure difference increases. Thus, the change-related gain G3 is the second change-related gain G3B (G3B=0). As a result, the amplitude A of the active noise RNa becomes zero regardless of the pump-related gain G1, the pressure difference-related gain G2, and the temperature-related gain G4. Therefore, during the period from the initial time point t0 to the second time point t2, the overlaid command signal IPpluse is equal to the pressure difference command signal IPsub.

Figure 7:
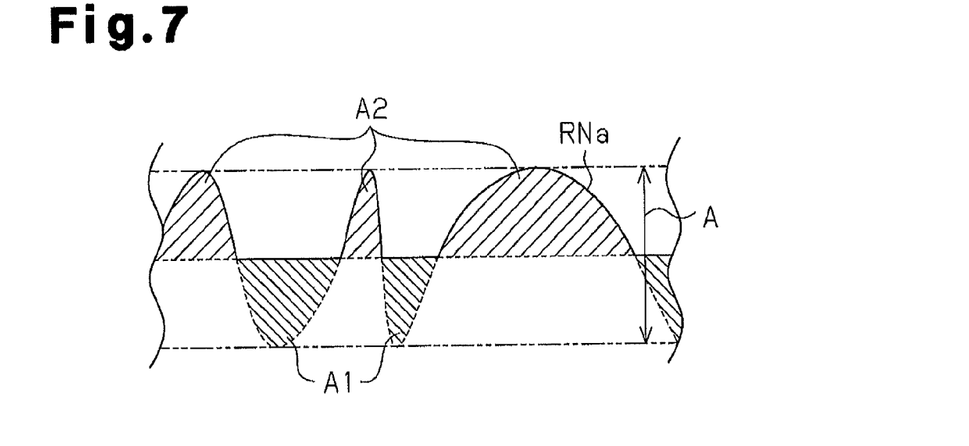
FIG. 7 is a graph for explaining active noise in a constant pressure state.

After the second time point t2, at which the current value I supplied to the coils 24c of the linear electromagnetic valves 23a, 23b is equal to a predetermined value It, the pumps 30a, 30b are activated to such a degree to prevent the wheel cylinder pressure Pwc from being lowered (that is, such that the pump discharge rate Qp is less than or equal to the first discharge rate Qp1). As a result, the wheel cylinder pressure Pwc is maintained. At this time, the pump discharge rate Qp is less than or equal to the discharge rate threshold value KQp, and the target pressure difference rate-of-change ΔPsub is less than or equal to the rate-of-change threshold value KDPsub. The cut flag FLGc is set to ON. In this case, the first amplitude component A1 of the active noise RNa, which reduces the actual pressure difference (that is, the value of the wheel cylinder pressure Pwc), is cut as shown in FIG. 7. During a period from the second time point t2 to a third time point t3, the linear electromagnetic valves 23a, 23b are controlled according to the overlaid command signal IPpluse containing the cut active noise RNa.

In the linear electromagnetic valves 23a, 23b, the valve body 24b always receives an urging force, which pushes the valve body 24b away from the valve seat 24a, by the urging member 24d. Also, the valve body 24b receives a force that corresponds to the pump discharge rate Qp (pump discharge force) while the pumps 30a, 30b are operating. Thus, when maintaining the wheel cylinder pressure Pwc, if the linear electromagnetic valves 23a, 23b are controlled according to an overlaid command signal IPpluse containing the active noise RNa from which the first amplitude component A1 is not cut, the valve body 24b may be displaced more than necessary in the direction to lower the wheel cylinder pressure Pwc. Therefore, the wheel cylinder pressure Pwc may fluctuate, so that braking force applied to the wheels varies. In this regard, the first amplitude component A1 of the active noise RNa is cut in the present embodiment. This prevents the valve body 24b from being displaced in a direction to lower the wheel cylinder pressure Pwc more than necessary. Therefore, the wheel cylinder pressure Pwc is reliably maintained, and braking force applied to the wheels is reliably maintained.

As shown in FIG. 6, after the third time point t3, the current value I supplied to the electromagnetic coils 24c of the linear electromagnetic valves 23a, 23b start being reduce. Then, the valve body 24b starts being moved away from the valve seat 24a, so that the wheel cylinder pressure Pwc starts decreasing. At this time, since the cut flag FLGc is turned OFF, an active noise RNa having both of the first amplitude component A1 and the second amplitude component A2 is generated.

The pumps 30a, 30b are not activated, so that the wheel cylinder pressure Pwc is lowered. Therefore, the pump discharge rate becomes zero, and the pump-related gain G1 is set to the maximum value (for example, one). This reduces the pump discharge rate Qp. Also, since the wheel cylinder pressure Pwc is reduced at a constant rate, the change-related gain G3 is constant. The target pressure difference rate-of-change ΔPsub at this point is less than the first rate-of-change ΔPsub1. As a result, the amplitude A of the active noise RNa is set to a value greater than that in a case where the wheel cylinder pressure Pwc is maintained. The target pressure difference Psub is greater than the first target pressure difference Psub1 until a fourth time point t4 passes, the pressure difference-related gain G2 is constant at the first pressure difference-related gain G2A (for example, one). Therefore, the amplitude A of the active noise RNa is constant.

After the fourth time point t4, the rate at which the current value I supplied to the electromagnetic coils 24c of the linear electromagnetic valves 23a, 23b is lowered is reduced. That is, the rate of decrease of the wheel cylinder pressure Pwc is reduced. However, after the fourth time point t4, the target pressure difference rate-of-change ΔPsub becomes greater than that before the fourth time point t4, and is a value greater than the first rate-of-change ΔPsub1 and less than the second rate-of-change ΔPsub2. Since the change-related gain G3 becomes less than that before the fourth time point t4, the amplitude A of the active noise RNa becomes small, also. Also, since the target pressure difference Psub becomes less than the first target pressure difference Psub1, the pressure difference-related gain G2 is reduced. The amplitude A of the active noise RNa is also reduced as the wheel cylinder pressure Pwc is reduced. After a fifth time point t5, at which the current value I becomes zero, the amplitude A of the active noise RNa becomes zero.

According to the prior art method for controlling an electromagnetic valve, the linear electromagnetic valves 23a, 23b in accordance with the pressure difference command value IPsub onto which the active noise RNa is not overlaid, so that the wheel cylinder pressure Pwc is reduced. In this case, since the response speed of the linear electromagnetic valves 23a, 23b is slow as shown by dashed lines in FIG. 6, the actual wheel cylinder pressure Pwc responses to the target wheel cylinder pressure (that is, the target pressure difference Psub) with a delay. Further, the actual wheel cylinder pressure Pwc has a low following capability to the target wheel cylinder pressure, and is reduced discretely. That is, the braking force applied to the wheels is reduced discretely. Such changes in the braking force can disturb the occupant of the vehicle.

In this regard, since the response speed of the linear electromagnetic valves 23a, 23b is fast as shown by solid lines in FIG. 6, the actual wheel cylinder pressure Pwc responses to the target pressure difference Psub with little delay. Further, the actual wheel cylinder pressure Pwc is smoothly reduced like the target wheel cylinder pressure. That is, the braking force applied to the wheels is smoothly reduced while insignificantly disturbing the occupants of the vehicle.

The present embodiment has the following advantages.

(1) The magnitude of micro vibration of the valve bodies 24b of the linear electromagnetic valves 23a, 23b changes in accordance with the pump discharge rate Qp of the pumps 30a, 30b. In the present embodiment, the amplitude A of the active noise RNa is set in accordance with the pump discharge rate Qp. The linear electromagnetic valves 23a, 23b are controlled according to the overlaid command signal IPpluse containing the active noise RNa. That is, the linear electromagnetic valves 23a, 23b are controlled based on the overlaid command signal IPpluse, which corresponds to the operating state of the pumps 30a, 30b. Therefore, the response speed of the linear electromagnetic valves 23a, 23b can be increased regardless of the operating state of the pumps 30a, 30b, so that the wheel cylinder pressure Pwc in the wheel cylinders can be reliably adjusted.

(2) The greater the pump discharge rate Qp, the more likely that the valve body 24b will displaced in a direction to decrease the wheel cylinder pressure Pwc. Thus, the greater the pump discharge rate Qp, the smaller the setting for the amplitude A of the active noise RNa. The magnitude of the micro vibration of the valve body 24b is insignificantly changed even if the pump discharge speed Qp fluctuates. That is, since the linear electromagnetic valves 23a, 23b are controlled according to the overlaid command signal IPpluse containing the active noise RNa, the micro vibration of the valve bodies 24b is prevented from being excessively great. Therefore, fluctuation of the response speed of the linear electromagnetic valves 23a, 23b is suppressed regardless of the magnitude of the pump discharge rate Qp. That is, regardless of the operating state of the pumps 30a, 30b, the response speed of the linear electromagnetic valves 23a, 23b are maintained at a high speed. Specifically, when the pump discharge rate Qp of the pumps 30a, 30b is great, the amplitude A of the active noise RNa is small. The micro vibration of the valve bodies 24b is therefore prevented from being excessively great, so that the response speed of the linear electromagnetic valves 23a, 23b are not lowered and the unnecessary fluctuation of the wheel cylinder pressure Pwc is suppressed. When the pump discharge rate Qp of the pumps 30a, 30b is small, the amplitude A of the active noise RNa is great. This reliably allows micro vibration of the valve bodies 24b, so as to prevent the response speed of the linear electromagnetic valves 23a, 23b from being lowered.

(3) The valve body 24b always receives an urging force, which pushes the valve body 24b away from the valve seat 24a, by the urging member 24d. Thus, when the magnitudes of the first and second amplitude components A1, A2 in the active noise RNa are equal to each other, the valve body 24b is likely to move away from the valve seat 24a, instead of toward the valve seat 24a. When attempting to suppress or prohibit reduction of the wheel cylinder pressure Pwc, that is, reduction of the braking force acting on the wheels, it is preferable to generate an active noise RNa that has a first amplitude component A1 smaller than a second amplitude component A2. In the present embodiment, when the pump discharge rate Qp is small and the target pressure difference rate-of-change ΔPsub is small, it is determined that the wheel cylinder pressure Pwc is at a constant pressure state, and an active noise RNa having no first amplitude component A1 is generated. The linear electromagnetic valves 23a, 23b are controlled according to the overlaid command signal IPpluse containing the active noise RNa. Therefore, when maintaining the wheel cylinder pressure Pwc, the wheel cylinder pressure Pwc is prevented from being unnecessarily reduced. Accordingly, the braking force applied to the vehicle is not unnecessarily lowered.

(4) When the target pressure difference Psub is great, the displacement of the valve body 24b is desired to be great. In the present embodiment, the greater the target pressure difference Psub, the greater the setting for the amplitude A of the active noise RNa. That is, when the displacement of the valve body 24b is increased, the micro vibration of the valve body 24b is increased. As a result, the response speed of the linear electromagnetic valves 23a, 23b is increased. That is, the braking force applied to the wheels is rapidly reduced to a target braking force, so that the braking control of the vehicle is performed accurately.

(5) In a case where the target pressure difference rate-of-change ΔPsub is less than zero, a small value of the target pressure difference rate-of-change ΔPsub indicates that the wheel cylinder pressure Pwc is desired to be quickly reduced. In the present embodiment, the smaller the target pressure difference rate-of-change ΔPsub, the greater the setting for the amplitude A of the active noise RNa. That is, when the wheel cylinder pressure Pwc is desired to be quickly lowered, the micro vibration of the valve body 24b is increased. As a result, the response speed of the linear electromagnetic valves 23a, 23b is increased. That is, the braking force applied to the wheels is rapidly reduced to a target braking force, so that the braking control of the vehicle is performed accurately.

(6) The lower the brake fluid temperature Tb, the higher its viscosity becomes. That is, the lower the temperature of the brake fluid, the less likely that micro vibration of the valve body 24b occurs. In the present embodiment, the lower the temperature of the brake fluid, the greater the setting for the amplitude A of the active noise RNa. Therefore, even if the temperature Tb of the brake fluid is low, micro vibration of the valve body 24b is reliably caused. Also, when the brake fluid temperature Tb is high, it is possible to prevent the micro vibration of the valve body 24b from being excessively great. Thus, the response speed of the linear electromagnetic valves 23a, 23b can be increased regardless of changes in the brake fluid temperature, that is, the viscosity, so that the wheel cylinder pressure Pwc is reliably adjusted.

(7) When causing micro vibration of the linear electromagnetic valves 23a, 23b, the brake fluid pulsates due to the micro vibration. Such pulsation can be transmitted to the brake pedal 21. In the present embodiment, when the brake pedal 21 is operated, the generation of the overlaid command signal IPpluse is restricted, and the linear electromagnetic valves 23a, 23b are controlled according to the pressure difference command signal IPsub. Micro vibration of the linear electromagnetic valves 23a, 23b is not caused. Thus, the driver operating the brake pedal 21 is not disturbed by pulsation of the brake fluid caused by micro vibration of the linear electromagnetic valves 23a, 23b.

(8) If the linear electromagnetic valves 23a, 23b are controlled according to an overlaid command signal IPpluse containing a noise having a constant frequency, the linear electromagnetic valves 23a, 23b can resonate. In the present embodiment, since the linear electromagnetic valves 23a, 23b are controlled according to the overlaid command signal IPpluse containing random noise, resonance of the linear electromagnetic valves 23a, 23b is substantially prevented regardless of individual differences of the linear electromagnetic valves 23a, 23b. Therefore, the wheel cylinder pressure Pwc is reliably adjusted, while improving the quietness of the braking device 11.

The above described embodiment may be modified according to the following further embodiments.

Figure 8:
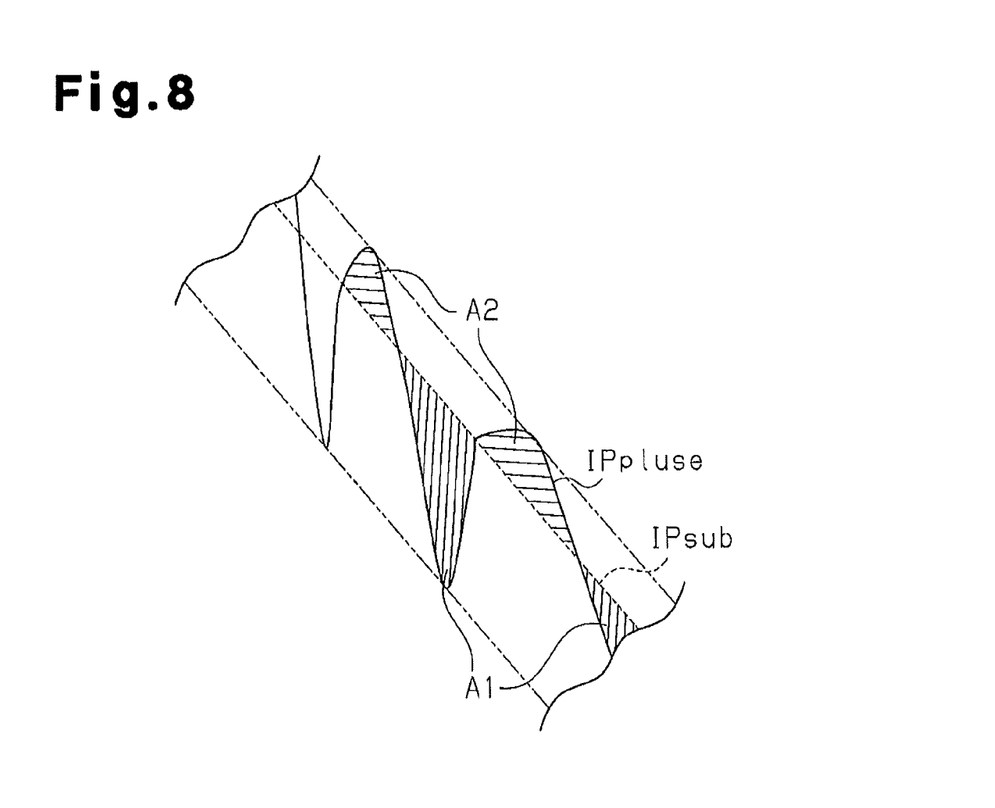
FIG. 8 is a timing chart showing a part of the changes in a current value supplied to a linear electromagnetic valve according to another embodiment of the present invention.

When reducing the wheel cylinder pressure Pwc, the second amplitude component A2 of the active noise RNa acts against the reduction, while the first amplitude component A1 acts for the reduction. Therefore, when reducing the wheel cylinder pressure Pwc, an active noise RNa as shown in FIG. 8 may be generated that contains a first amplitude component A1 greater than a second amplitude component A2, and the linear electromagnetic valves 23a, 23b may be controlled according to an overlaid command signal IPpluse containing the active noise RNa. For example, the first amplitude component A1 may be N times greater than the second amplitude component A2 (N is an integer greater than one, for example, N=2). In this case, the response speed of the linear electromagnetic valves 23a, 23b can be increased compared to a case where the first and second amplitude components A1, A2 are substantially the same. This modification thus contributes to a quick reduction in the wheel cylinder pressure Pwc.

It may be configured such that the greater the rate of reduction of the wheel cylinder pressure Pwc, the greater the first amplitude component A1 than the second amplitude component A2 becomes. For example, during the period from the third time point t3 to the fourth time point t4 in FIG. 6, the first amplitude component A1 may be N times greater than the second amplitude component A2 (N is an arbitrary number greater than one, for example N=2). During the period from the fourth time point t4 to the fifth time point t5, the first amplitude component A1 may be M times greater than the second amplitude component A2 (M is a number greater than one and smaller than N, for example, M=1.5). According to this configuration, the lower the rate of reduction of the wheel cylinder pressure Pwc, the higher the response speed of the linear electromagnetic valves 23a, 23b. This modification thus contributes to a quick reduction in the wheel cylinder pressure Pwc.

Step S12 may be omitted. In this case, the active noise generating process routine may include a process for setting a brake-related gain value in accordance with the operating state of the brake pedal 21. For example, the brake-related gain may be zero while the brake pedal 21 is operated, and one while the brake pedal 21 is not being operated. When setting the amplitude A of the active noise RNa, the reference amplitude may be multiplied by the brake-related gain in addition to the other gains. With this configuration also, the same advantages as the above illustrated embodiment are obtained.

Also, the amount of operation of the brake pedal 21 (that is, the master cylinder pressure) may be set to a value greater than 0. That is, while the brake pedal 21 is being operated, the active noise RNa may be generated, and the linear electromagnetic valves 23a, 23b may be controlled according to the overlaid command signal IPpluse containing the active noise RNa.

The amplitude A of the active noise RNa may be determined without taking the brake fluid temperature Tb into consideration. In this case, the temperature sensor SE1 may be omitted from the brake actuator 18.

The fourth map may be configured such that the amplitude A does not become zero when the linear electromagnetic valves 23a, 23b are activated for increasing the wheel cylinder pressure Pwc. In this case, the second amplitude component A2 of the active noise RNa is preferably greater than the first amplitude component A1.

When the pump discharge speed Qp is low and the wheel cylinder pressure Pwc changes insignificantly and is in a constant state, an active noise RNa containing the first amplitude component A1 may be generated, and the linear electromagnetic valves 23a, 23b may be controlled according to the overlaid command signal IPpluse containing the active noise RNa. However, the generated active noise RNa preferably has a first amplitude component A1 smaller than a second amplitude component A2.

The amplitude A of the active noise RNa may be determined without taking the target pressure difference rate-of-change ΔPsub.

The amplitude A of the active noise RNa may be determined without taking the target pressure difference Psub.

The increase valves 26a to 26d may be controlled according to the overlaid command signal IPpluse containing the active noise RNa.

The linear valve controlling section 46 may include hardware such as an amplifier and a switching element. In this case, the amplifier is preferably activated based on a control command from the main controlling section 41.

The reference noise RNb may be a noise the frequency of which changes regularly (for example, gradually increases or decreases). Also, the reference noise RNb may have a constant frequency. In this case, the frequency of the reference noise RNb is preferably set not to resonate the linear electromagnetic valves 23a, 23b.

The frequency of the active noise RNa may be set in accordance with the pump discharge rate Qp.

What is claimed is:

1. A brake fluid pressure controlling device for controlling a brake actuator to adjust brake fluid pressure in a wheel cylinder provided to correspond to a wheel, the brake actuator including a passage for supplying the brake fluid to the wheel cylinder, a pump that discharges the brake fluid to the passage, and an electromagnetic valve that is located in the passage and adjusts the pressure of the brake fluid flowing into the wheel cylinder, the device comprising:
    a discharge rate detecting section detecting the discharge rate of the brake fluid discharged by the pump;
    a signal generating section generating a command signal for controlling the electromagnetic valve;
    a noise generating section generating noise, the noise being an AC signal corresponding to the detected discharge rate;
    a noise overlaying section overlaying the noise onto the command signal, thereby generating an overlaid command signal; and
    an electromagnetic valve controlling section controlling the electromagnetic valve according to the overlaid command signal.

2. The brake fluid pressure controlling device according to claim 1, wherein the greater the detected discharge rate, the smaller the amplitude of the noise set by the noise generating section.

3. The brake fluid pressure controlling device according to claim 2, wherein the electromagnetic valve operates in the passage to adjust the brake fluid pressure between the electromagnetic valve and the wheel cylinder,
    the device further comprising a fluid pressure rate-of-change detecting section that detects the rate-of-change of the brake fluid in the wheel cylinder,
    wherein, when the detected discharge rate is less than or equal to a predetermined discharge rate threshold value and the absolute value of the detected rate-of-change is less than or equal to a predetermined rate-of-change threshold value, the noise generating section reduces an amplitude component in the amplitude of the noise, which component acts to lower the brake fluid pressure in the wheel cylinder.

4. The brake fluid pressure controlling device according to claim 2, wherein the electromagnetic valve operates in the passage to adjust the brake fluid pressure between the electromagnetic valve and the wheel cylinder,
    wherein, when the brake fluid pressure in the wheel cylinder is lowered, the noise generating section makes, a first amplitude component in the amplitude of the noise greater than a second amplitude component, the first amplitude component acting to lower the brake fluid pressure in the wheel cylinder, and the second amplitude component acting to increase the brake fluid pressure in the wheel cylinder.

5. The brake fluid pressure controlling device according to claim 2, further comprising a fluid pressure lowering rate detecting section detecting the rate at which the brake fluid pressure in the wheel cylinder is lowered,
    wherein, when the brake fluid pressure in the wheel cylinder is lowered, the greater the detected lowering rate, the greater a first amplitude component in the amplitude of the noise set by the noise generating section, the first amplitude component acting to lower the brake fluid pressure in the wheel cylinder.

6. The brake fluid pressure controlling device according to claim 2, wherein the noise is random noise of which at least one of the frequency or the amplitude changes irregularly.

7. The brake fluid pressure controlling device according to claim 1, wherein the electromagnetic valve operates in the passage to adjust the brake fluid pressure between the electromagnetic valve and the wheel cylinder,
    the device further comprising a fluid pressure rate-of-change detecting section that detects the rate-of-change of the brake fluid in the wheel cylinder,
    wherein, when the detected discharge rate is less than or equal to a predetermined discharge rate threshold value and the absolute value of the detected rate-of-change is less than or equal to a predetermined rate-of-change threshold value, the noise generating section reduces an amplitude component in the amplitude of the noise, which component acts to lower the brake fluid pressure in the wheel cylinder.

8. The brake fluid pressure controlling device according to claim 7, wherein the electromagnetic valve operates in the passage to adjust the brake fluid pressure between the electromagnetic valve and the wheel cylinder,
    wherein, when the brake fluid pressure in the wheel cylinder is lowered, the noise generating section makes a first amplitude component in the amplitude of the noise greater than a second amplitude component, the first amplitude component acting to lower the brake fluid pressure in the wheel cylinder, and the second amplitude component acting to increase the brake fluid pressure in the wheel cylinder.

9. The brake fluid pressure controlling device according to claim 7, further comprising a fluid pressure lowering rate detecting section detecting the rate at which the brake fluid pressure in the wheel cylinder is lowered,
    wherein, when the brake fluid pressure in the wheel cylinder is lowered, the greater the detected lowering rate, the greater a first amplitude component in the amplitude of the noise set by the noise generating section, the first amplitude component acting to lower the brake fluid pressure in the wheel cylinder.

10. The brake fluid pressure controlling device according to claim 7, wherein the noise is random noise of which at least one of the frequency or the amplitude changes irregularly.

11. The brake fluid pressure controlling device according to claim 1, wherein the electromagnetic valve operates in the passage to adjust the brake fluid pressure between the electromagnetic valve and the wheel cylinder,
    wherein, when the brake fluid pressure in the wheel cylinder is lowered, the noise generating section makes a first amplitude component in the amplitude of the noise greater than a second amplitude component, the first amplitude component acting to lower the brake fluid pressure in the wheel cylinder, and the second amplitude component acting to increase the brake fluid pressure in the wheel cylinder.

12. The brake fluid pressure controlling device according to claim 11, further comprising a fluid pressure lowering rate detecting section detecting the rate at which the brake fluid pressure in the wheel cylinder is lowered,
    wherein, when the brake fluid pressure in the wheel cylinder is lowered, the greater the detected lowering rate, the greater a first amplitude component in the amplitude of the noise set by the noise generating section, the first amplitude component acting to lower the brake fluid pressure in the wheel cylinder.

13. The brake fluid pressure controlling device according to claim 11, wherein the noise is random noise of which at least one of the frequency or the amplitude changes irregularly.

14. The brake fluid pressure controlling device according to claim 1, further comprising a fluid pressure lowering rate detecting section detecting the rate at which the brake fluid pressure in the wheel cylinder is lowered, wherein, when the brake fluid pressure in the wheel cylinder is lowered, the greater the detected lowering rate, the greater a first amplitude component in the amplitude of the noise set by the noise generating section, the first amplitude component acting to lower the brake fluid pressure in the wheel cylinder.

15. The brake fluid pressure controlling device according to claim 14, wherein the noise is random noise of which at least one of the frequency or the amplitude changes irregularly.

16. The brake fluid pressure controlling device according to claim 1, wherein the noise is random noise of which at least one of the frequency or the amplitude changes irregularly.

* * * * *